United States Patent
Weiteder et al.

[11] Patent Number: 6,007,756
[45] Date of Patent: Dec. 28, 1999

[54] PROCESS AND DEVICE FOR PERFORATING OR CUTTING PRINTED LAMINATED COMPOSITE MATERIALS

[75] Inventors: Hans Weiteder, Herzogenrath; Holger Schmidt, Inden-Lamersdorf, both of Germany

[73] Assignee: SIG Combibloc GmbH, Linnich, Germany

[21] Appl. No.: 08/981,175

[22] PCT Filed: Jun. 5, 1996

[86] PCT No.: PCT/EP96/02447

§ 371 Date: Apr. 14, 1998

§ 102(e) Date: Apr. 14, 1998

[87] PCT Pub. No.: WO96/41698

PCT Pub. Date: Dec. 27, 1996

[30] Foreign Application Priority Data

Jun. 12, 1995 [DE] Germany .................... 195 20 713

[51] Int. Cl.[6] .................................................. B23K 26/10
[52] U.S. Cl. .................... 264/400; 219/121.67; 264/482; 425/174.4
[58] Field of Search .................... 264/400, 482; 219/121.69, 121.8, 121.67; 425/174.4

[56] References Cited

U.S. PATENT DOCUMENTS

| 3,790,744 | 2/1974 | Bowen ............................... 264/400 |
| 5,688,463 | 11/1997 | Robichaud et al. ............ 264/400 |
| 5,843,364 | 12/1998 | Robichaud et al. ............ 264/400 |

FOREIGN PATENT DOCUMENTS

| 357 841 | 3/1990 | European Pat. Off. . |
| 2 161 427 | 1/1986 | United Kingdom . |

*Primary Examiner*—Mathieu D. Vargot
*Attorney, Agent, or Firm*—Standley & Gilcrest LLP

[57] ABSTRACT

A process and device are disclosed for perforating and/or partially cutting printed laminated composite materials by means of laser beams from at least one laser arranged in a laser station. In order to minimize equipment costs, in particular for the control of the perforation and/or partial cutting processes, without having to renounce to an exact positioning of the perforations and/or partial cuts, a process is disclosed characterized by the following steps: the laminated composite material web is cut into individual blanks (1) according to the printed image and/or folding pattern; the blanks (1) are transported to the laser station; and the perforations or partial cuts are carried out in the stationary blank (1). Also disclosed are means for carrying out the process.

16 Claims, 3 Drawing Sheets

PROCESS AND DEVICE FOR PERFORATING OR CUTTING PRINTED LAMINATED COMPOSITE MATERIALS

BACKGROUND AND SUMMARY OF THE INVENTION

The invention relates to a process and a device for producing perforations and/or semi-cuts in printed multilayer composite material by means of laser beams from at least one laser arranged in a laser station.

Multilayer composite material is used in particular for packaging foodstuffs in folding box packages. In this a base layer of cardboard, paperboard or paper and if applicable an aluminium foil layer arranged on top of it is provided on both sides with a layer of polyethylene (PE), in order to provide the subsequent package with the necessary characteristics regarding impermeability, ability to keep out oxygen, protection of the contents from light etc. As such known packages are primarily used for milk, juice or similar; as a rule these packages contain a printed image comprising details concerning the content, manufacturer, advertising or similar.

As a rule, the multilayer composite material is produced as a sheet material; the surface of the material which will later be on the outside of the package is provided with the desired printed images and transported on rollers or directed to further use. Folding box packaging made from this material often comprises weakening lines in the base material and the exterior PE layer, for example to facilitate the insertion of drinking straws into the package or else to enable the intrusion of pouring aids. Such weakening lines which are either made as perforations or as semi-cuts (weakening lines in one or several layer/s of the composite material/s) must therefore be positioned on the composite material depending on the printed image, so as to be "correctly" located in the subsequent package.

From EP 0 357 841 B1, it is already known to lead a sheet of composite material past a laser station, depending on the printed image, with the control of the laser taking place depending on the previously scanned printed image. It is quite evident that this process is extremely expensive because laser treatment has to be carried out while the sheet is moving. To this purpose the movement of the laser beam must not only take into account the actual contour of the notch but also the speed of the sheet.

From GB 21 61 427 A a process by itself for treating thermoplastic cut shapes e.g. PVC is already known, in which folding lines are made in these cut shapes by means of a laser beam applied through a mask, in order to fold a container for packaging purposes from this cut shape. In this it is however necessary to fix the PVC cut shapes onto negative-pressure tables in order to treat the said cut shapes. By contrast, the process according to the invention does not require such construction expenditure.

In addition, the production of cut shapes with smooth-cut edges from sheets of paper, by the application of laser beams, has by itself also been known for a long time (DE 32 22 394 A1). In addition, a laser beam has already been used as a device for longitudinal separation of sheet material on sheet processing machines, as is known from DE 26 14 941 A1by itself.

It is thus the object of the present invention to further improve and develop a device of the type mentioned in the introduction in that the construction effort in particular regarding the control during the production of the perforation and/or the semi-cuts, is minimised without having to renounce exact positioning of the perforations and/or semi-cuts.

In a process of the type mentioned in the introduction, this object is met by the following steps:

cutting the sheet of multilayer composite material into individual cut shapes, depending on the printed image and/or the fold pattern;

transporting the cut shapes to the laser station;

positioning and fixing the cut shapes laterally and in the plane of laser treatment by means of limit-stop means; and producing the perforation lines or semi-cut lines while the cut shape is stationary, depending on the limit-stops.

Regarding a device, the task is solved by providing a device for cutting the sheet of multilayer composite material into individual cut shapes, a laser station with at least one laser and respective deflector devices for guiding each laser beam as well as limit-stop means for positioning the individual cut shapes fed to the laser station, in the plane of laser treatment, and providing respective transport means and/or stacking means for the individual cut shapes.

According to the invention it is thus no longer the moving sheet of multilayer composite material which is subjected to laser treatment but the said sheet is first cut into individual cut shapes which are then laser-treated and from which finally the actual packages are produced. Since printing of the composite material takes place mechanically and thus in good register, the sheet of composite material, too, is cut into cut shapes in good register, so that laser treatment is no longer undertaken depending on the printed image but rather can be undertaken depending on the edges of the cut shapes. In this way, the construction effort with the process according to the invention and the respective device is clearly less than in the known process because elaborate recognition of the printed image and complicated laser control system depending on the speed of the sheet can be done without.

According to a preferred embodiment of the invention, during laser treatment the cut shapes to be treated are aligned in a horizontal plane. In this way, gravity is used to let the flat cut shapes rest in one plane so that no surface curvatures, throws or similar can result.

In this, the actual laser treatment of the stationary cut shapes can be handled according to three alternative options. A first embodiment of the invention provides for the individual cut shapes to be stacked prior to laser treatment; for laser treatment to take place on the topmost cut shape in the stack; and for the treated cut shapes to be drawn off individually from the stack, step by step to one side. Alternatively it is however also possible for the individual cut shapes to be fed to the laser station and stacked there; for laser treatment to take place on the topmost cut shape in the stack; and for the stack forming below the laser station to be moved downwards, step by step; or else for the cut shapes to undergo laser treatment individually, With the first and third variant it is advantageous, in a further embodiment of the invention, to stack the finished cut shapes behind the laser station.

In this, selection of the optimal form of laser treatment depends first of all on the space available and the operational requirements. Thus the first alternative suggests itself in particular in those cases where the cut shapes which have been previously separated, are already stacked, for example in order to be transported to the laser station. The second alternative is always of advantage if the laser-treated cut shapes are to be stacked anyway. In this, depending on the operational circumstances, supply of the cut shapes to the laser station can take place directly or else by using one or several intermediary stacking magazines, in order to separate the printing and cutting processes on the one hand, from the laser treatment process on the other hand.

According to a further teaching of the invention, the intensity of the laser beam or beams applied is adjustable. This is of great importance in particular for the production of semi-cuts since, depending on the design of the multilayer composite material, a different intensity of local evaporation in one or several layers of the material to be removed is required.

From the point of view of device design, the three alternative processes take place in such a manner that the limit-stop means for positioning and fixing the cut shapes to be treated are designed in such a way that the laser station comprises a chute through which a multiple number of horizontally stacked cut shapes are fed from below; or else that the limit-stop means are designed in such a way that the individual cut shapes are laterally fed to the laser station and that below the laser station a stacking magazine for the completely treated cut shapes is arranged. It is advantageous if according to a further teaching of the invention, there is a stacking device behind the laser station, for holding the cut shapes upon completion of their treatment.

If the laser station is not to be equipped with a feed chute or removal chute for feeding or removing stacks of cut shapes, then in the device according to the third alternative, the limit-stop means are designed in such a way that the individual cut shapes of the laser station are fed in and removed again in the treatment plane. For the cut shapes fed to the laser station horizontally, it is advantageous if in front of the laser station, means for stacking and singling out cut shapes are arranged in order to separate the above-mentioned procedures of printing and cutting on the one hand, and laser treatment on the other hand.

BRIEF DESCRIPTION OF THE DRAWINGS

Below, the three variants according to the invention are illustrated in more detail by means of a drawing merely showing embodiments of the invention, where.

DESCRIPTION OF THE INVENTION

Figure 1:
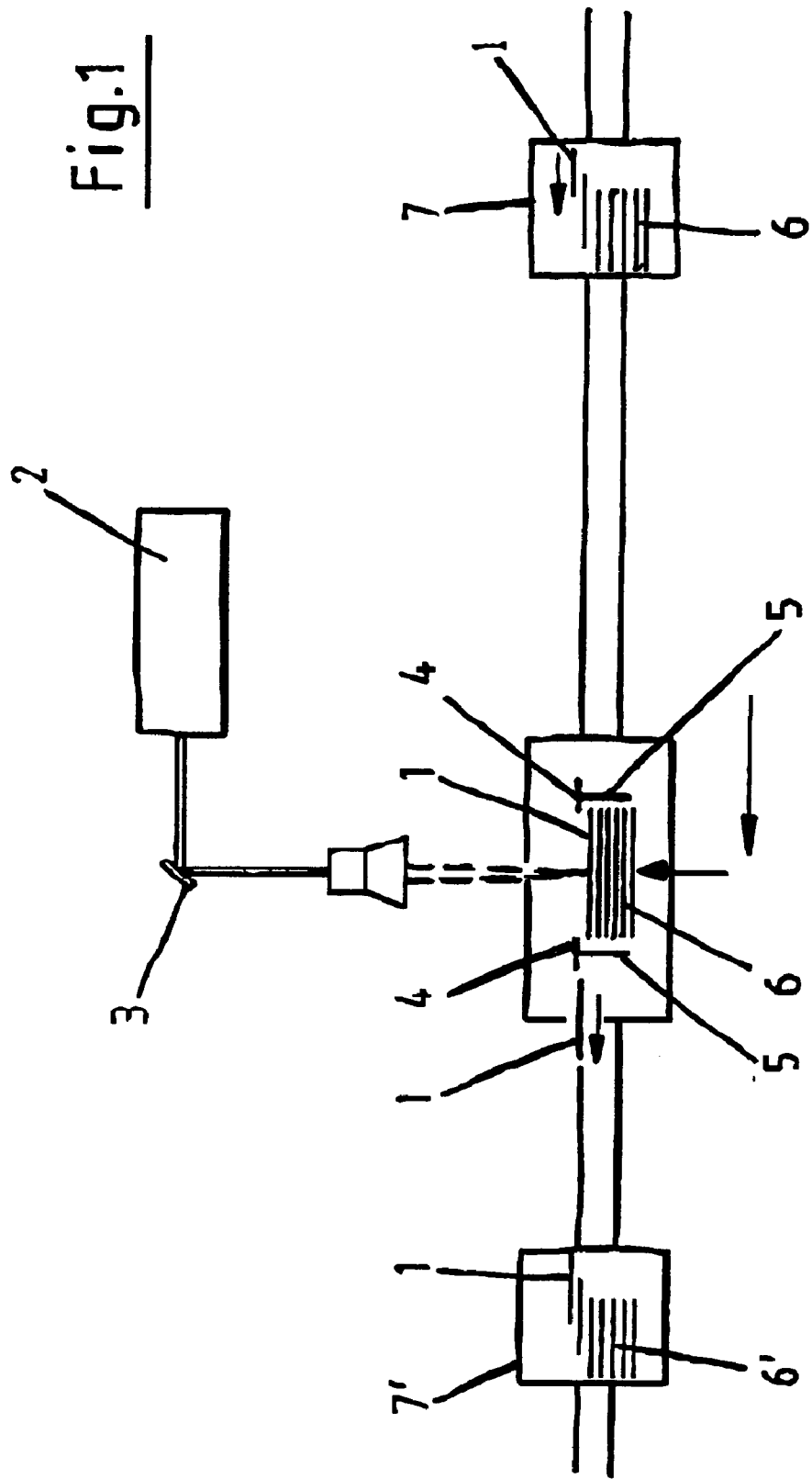
FIG. 1 shows a first embodiment of a device according to the invention in diagrammatic representation.

In the drawing, identical components are represented by identical reference characters. In the case of all three variants, cut shapes 1 are provided with perforations and/or semi-cuts by at least one laser beam of a laser 2, by way of deflector devices 3 shown diagrammatically only. In all three Figs., the direction of movement of the cut shapes 1 is in the direction of the arrows which are not further designated, i.e. from right to left.

In the first variant, shown in FIG. 1, feeding the cut shapes 1 takes place from below, with the topmost cut shape 1 always being limited by a height stop 4, in order to fix the cut shape 1 in the focal plane of the laser 2. A chute guide 5, also shown in diagrammatic representation only, ensures that the stack 6 previously made from cut shapes 1 is fed in such a way that the cut shapes 1 are horizontally surrounded without any play, by the side walls of the chute. In the embodiment shown in FIG. 1 which is the preferred embodiment, the cut shapes 1 after completion of treatment by the laser 2 are fed to a stacker 7' and there placed in stacks 6'. In addition, FIG. 1 shows a further preceding stacker 7, shown in dot-dash outline, which after singling out the cut shapes 1 is used to produce stack 6 from where the cut shapes are then fed to the actual laser station.

Figure 2:
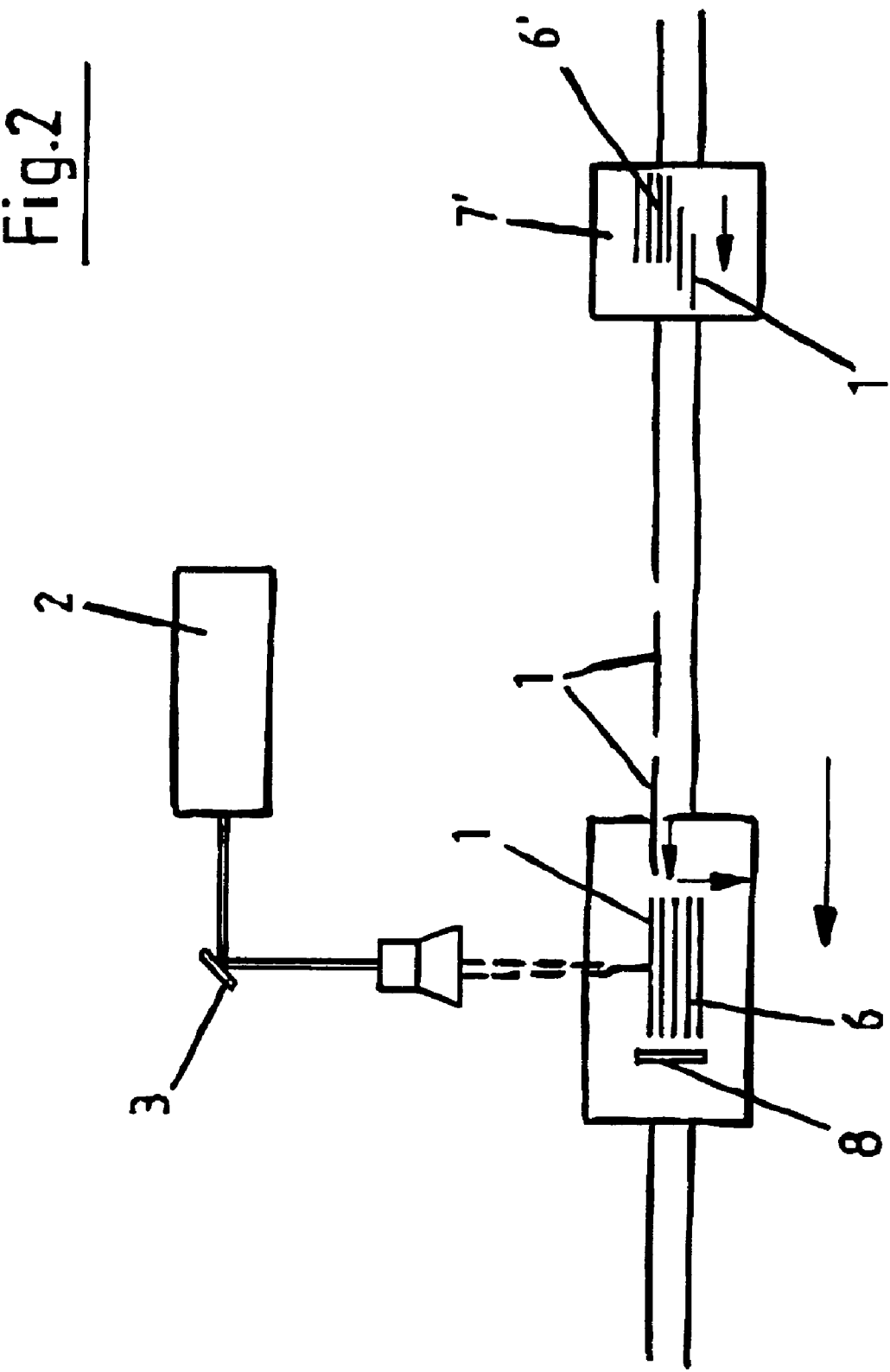
FIG. 2 shows a second embodiment of the device according to the invention.

The device shown in FIG. 2 differs from that in FIG. 1 in that the feeding of the cut shapes 1 takes place laterally in a horizontal plane with a lateral limit stop 8 ensuring that the cut shapes 1 to be treated are fixed without any play. In this, stack formation of the cut shapes 1 which have already undergone laser treatment takes place below the treatment plane, by step-by-step lowering of the cut shapes which have undergone treatment.

Figure 3:
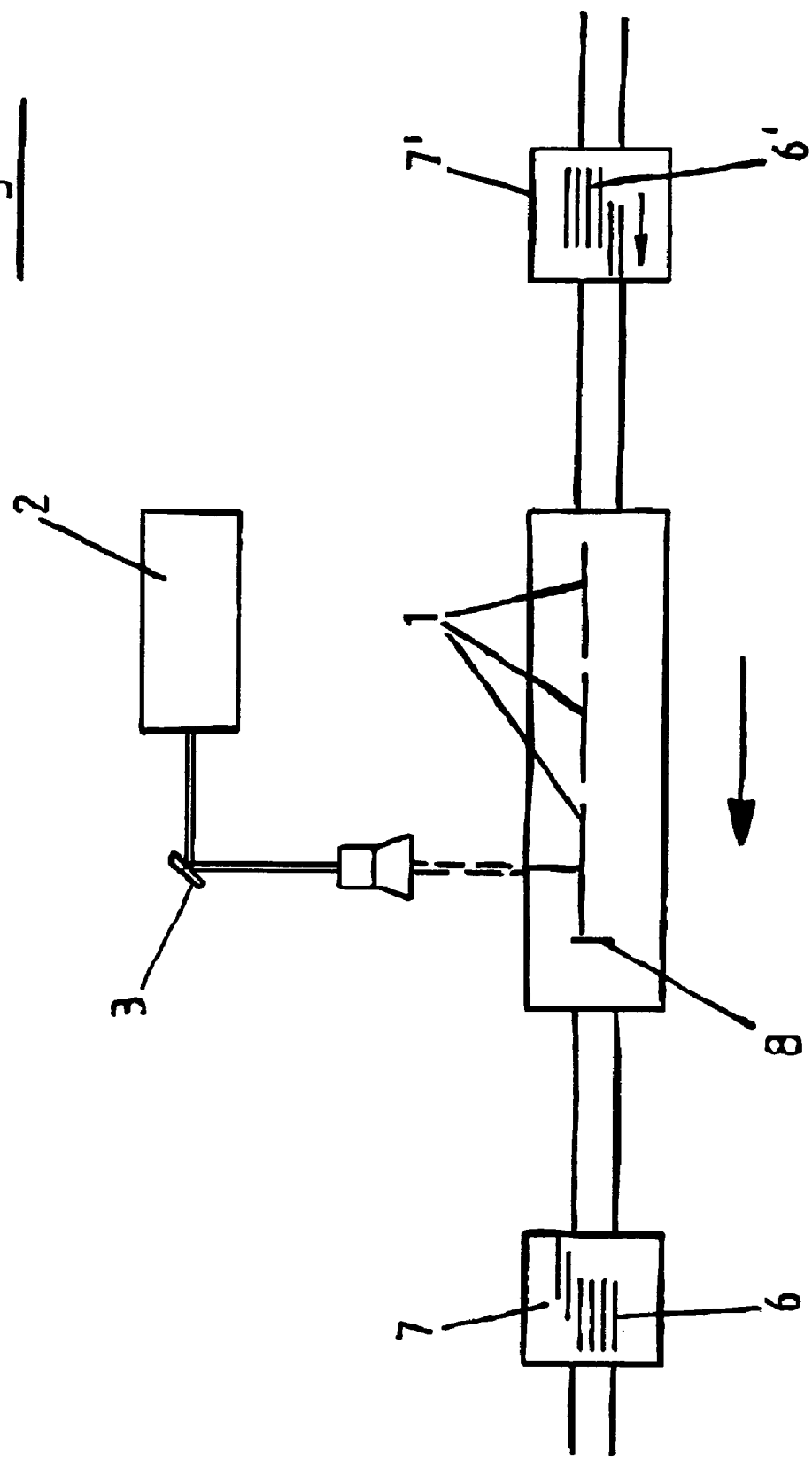
FIG. 3 shows a third embodiment of the device according to the invention.

Finally, FIG. 3 shows a third variant of the device according to the invention in which both feed-in to, and removal from, the laser station, of the cut shapes 1 occurs in the horizontal treatment plane. It is advantageous if here too, the cut shapes 1 are stacked to stacks 6 in a downstream stack former 7; with the stacks portioned for subsequent further treatment. Here too, it can be advantageous to single out already existing stacks 6' by a further stacker 7' preceding the laser station, in order to attain separation of the preceding printing and cutting devices.

What is claimed is:

1. A process for producing perforation lines and/or semi-cut lines in printed multilayer composite material using laser beams from at least one laser arranged in a laser station, comprising:

cutting the sheet of multilayer composite material into individual cut shapes, depending on the printed image and/or fold pattern;

transporting the cut shapes to the laser station;

positioning and fixing the cut shapes laterally and in the plane of laser treatment with limit-stops; and producing the perforation lines or semi-cut lines while the cut shape is stationary, depending on the limit-stops.

2. A process according to claim 1, further comprising aligning the cut shapes to be treated in a horizontal plane.

3. A process according to claim 1, further comprising stacking the individual cut shapes prior to laser treatment, treating the topmost cut shape in the stack with the laser, and drawing the treated cut shapes off individually from the stack to one side.

4. A process according to claim 1, further comprising moving previously treated cut shapes downward, feeding the individual cut shapes to the laser station, placing the cut shapes on top of the previously treated cut shapes to form a stack, and treating the topmost cut shape in the stack with the laser.

5. A process according to claim 1, wherein the cut shapes undergo laser treatment individually.

6. A process according to claim 3, further comprising conveying the stack upward step-by-step from below against a height stop whose lower edge is in the treatment plane of the laser.

7. A process according to claim 3, further comprising stacking the treated cut shapes.

8. A process according to claim 1, further comprising adjusting the intensity of the laser beam.

9. A device for producing perforation lines and/or semi-cut lines in printed multilayer composite material, comprising:

a device for cutting a sheet of multilayer composite material into individual cut shapes;

a laser station comprising:
at least one laser;
at least one deflector device for guiding each laser beam; and at least one limit-stop to position the individual cut shapes fed to the laser station;

a transport device; and optionally, a stacking device.

10. A device according to claim 9, wherein the laser station is arranged above the horizontally arranged cut shapes to be treated on the printed side.

11. A device according to claim 9, wherein the at least one limit stop comprises a chute by which a multiple number of horizontally stacked cut shapes are fed from below.

12. A device according to claim 9, wherein the at least one limit stop is designed so that the individual cut shapes are laterally supplied to the laser station.

13. A device according to claim 12, further comprising a stacking magazine located below the laser station to hold the treated cut shapes.

14. A device according to claim 9, wherein the at least one limit stop is arranged so that the individual cut shapes are fed to the laser station and removed in the treatment plane.

15. A device according to claim 9, further comprising a stacking device for the treated cut shapes located after the laser station.

16. A device according to claim 9, further comprising a stacking device located ahead of the laser station.

* * * * *